United States Patent [19]

Sela

[11] Patent Number: 4,530,632
[45] Date of Patent: Jul. 23, 1985

[54] STACKING APPARATUS FOR FLEXIBLE, GENERALLY PLANAR FOOD PRODUCTS

[75] Inventor: Richard Sela, Yakima, Wash.

[73] Assignee: ARR-Tech Manufacturing, Inc., Moxee, Wash.

[21] Appl. No.: 504,135

[22] Filed: Jun. 14, 1983

[51] Int. Cl.³ ............................................. B65G 57/04
[52] U.S. Cl. ...................................... 414/35; 198/493; 198/689; 271/186; 271/195; 271/197; 414/45; 414/73; 414/901; 414/903
[58] Field of Search ...................... 414/350, 43, 45, 72, 414/73, 75, 901, 903; 198/474, 689, 796, 802, 809, 493; 271/82, 85, 186, 195, 197

[56] References Cited

U.S. PATENT DOCUMENTS

| | | | |
|---|---|---|---|
| 3,237,753 | 3/1966 | Allen et al. | 198/689 |
| 3,300,065 | 1/1967 | Witmer | 414/903 X |
| 3,318,351 | 5/1967 | Werder | 414/901 X |
| 3,406,966 | 10/1968 | Walton | 271/197 X |
| 3,525,443 | 8/1970 | Pomara | 414/35 |
| 3,915,316 | 10/1975 | Pomara | 414/35 |
| 3,955,665 | 5/1976 | Pettis et al. | 198/809 X |
| 3,971,481 | 7/1976 | Longenecker et al. | 271/82 X |
| 4,027,580 | 6/1977 | Sundin | 271/186 X |
| 4,304,508 | 12/1981 | Wolf | 198/689 X |
| 4,405,186 | 9/1983 | Sandberg et al. | 414/45 X |

Primary Examiner—Leslie J. Paperner
Attorney, Agent, or Firm—Seed and Berry

[57] ABSTRACT

An apparatus for counting and stacking food products such as tortillas. The tortillas are initially placed on an entry chute containing a large number of air outlets for creating a cushion of air to allow the tortilla to slide down the entry chute onto an incline conveyor belt. The conveyor belt is of an open mesh design and it is supported on a belt support having a large number of air inlets which create a vacuum that maintains the tortilla in contact with the belt. The tortillas are carried by the belt down one end of the belt support and along the underside of the belt support with contact between the tortilla and belt being maintained by vacuum creating air inlets formed in the belt support. The air inlets terminate at a location on the underside of the belt support thereby allowing the tortillas to drop from the conveyor belt. The tortillas drop onto a stationary rack formed by rods which are interleaved with conveyor belts moving together as a unit. The conveyor belts are normally positioned beneath the upper surface of the rack. However, when a predetermined number of tortillas have been stacked, the belt is lifted thereby carrying the tortillas from the rack. The mechanism for lifting the belts is actuated by a counter which counts a predetermined number of tortillas passing past a counting station and delays actuating the belt lifting mechanism until the final tortilla has dropped onto the rack. The belts discharging the stacks of tortillas move in the direction opposite the direction that the tortillas are delivered to the rack in order to minimize the time required to remove the tortillas from the rack before an additional tortilla may be placed thereon.

20 Claims, 8 Drawing Figures

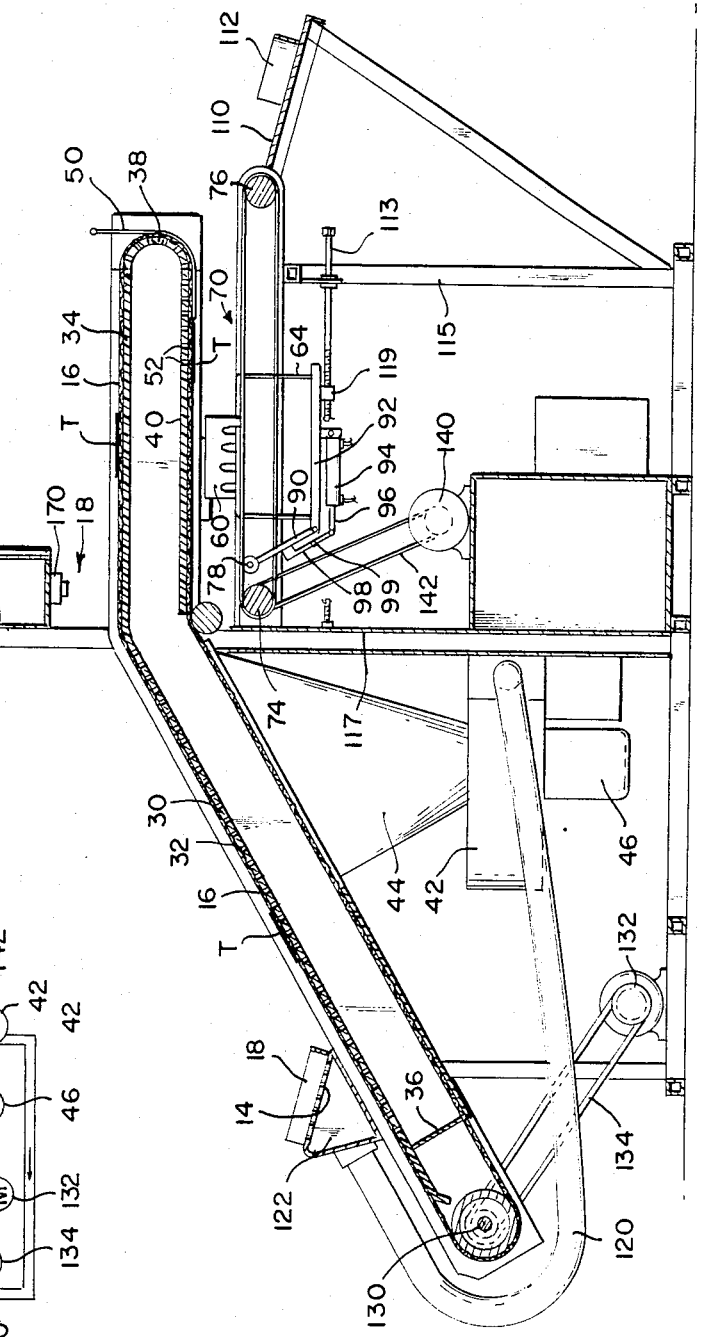

STACKING APPARATUS FOR FLEXIBLE, GENERALLY PLANAR FOOD PRODUCTS

DESCRIPTION

1. Technical Field

This invention relates to food handling equipment and, more particularly, to equipment for stacking flexible, generally planar food products, such as tortillas, and then discharging each of the stacks after a predetermined number have been stacked.

2. Background Art

A significant portion of the cost of manufacturing certain food products results from the labor cost in handling such products during manufacturing and/or packaging. For example, flexible, generally planar food products such as tortillas are generally discharged from an oven or other processing machine in a randomly spaced sequence. The tortillas are then hand counted and stacked. The labor cost incurred in manually counting and stacking the tortillas is a significant portion of the cost of tortillas. Furthermore, there is a distinct limit to the speed at which tortillas may be manually stacked and counted. Accordingly, attempts have been made to devise machines for counting and stacking flexible, generally planar products such as tortillas. For example, U.S. Pat. No. 4,006,831 discloses an apparatus for stacking tortillas in which tortillas are placed on a moving conveyor belt and then flung from that belt against aligning arms 72, 74. The tortillas then fall onto a stationary rack. When a predetermined number of tortillas have been stacked on the rack, the rack is lowered so that the tortillas are then supported by a moving conveyor belt. At the same time, the aligning arms pivot downwardly to allow the stack of tortillas to move with the belt. The apparatus disclosed in the U.S. Pat. No. 4,006,831 has several practical limitations. First, the machine attempts to fling the tortillas horizontally from the belt. Yet food products such as tortillas are sufficiently flexible that they often cannot be flung in this manner without causing the tortilla to fold or bend. This is a particular problem with certain types of tortillas such as flour tortillas and certain corn tortillas. In fact, conventional tortilla counting and stacking machines such as those illustrated in the references disclosed herein, are incapable of handling these types of tortillas. Second, the stack of tortillas are removed from the rack in the same direction that the tortillas are moving when they are flung onto the rack. Insofar as a tortilla may be flung from the conveyor belt at the same time that the stack of tortillas may be removed from the rack, the flung tortilla and stack of tortillas will then be moving in the same direction. When stacks of tortillas are removed in this manner, the particular flight characteristics of tortillas requires a relatively large amount of time for the stack of tortillas to move a sufficient distance so that it is not struck by the flung tortilla. In other words, moving the stack of tortillas in the same direction as the flung tortilla limits the rate of which tortillas can be flung from the belt without striking the stack of tortillas since a sufficient time must be allowed to allow the stack of tortillas to be removed. Third, since the stack of tortillas is removed in the same direction in which they are flung against the aligning rods, it is necessary to move the aligning rods so they do not interfere with removal of the stack of tortillas. This also increases the removal time of the tortilla stack and unduly complicates the mechanism for removing the tortilla stack.

U.S. Pat. No. 3,392,853 to Mitchell, et al. discloses a tortilla counting and stacking apparatus in which tortillas are individually placed on a pair of door or shutter members which are selectively opened to drop the tortillas onto a stack. The principal limitation of the Mitchell, et al. device is that the tortillas do not release symmetrically from the shutters. Instead, the tortillas cling to one shutter for a longer time than the other. The length of time the tortilla will cling to any one door is entirely random and thus it is impossible to precisely regulate where the tortilla will be dropped.

U.S. Pat. No. 3,525,443 discloses a counting and stacking device which, like the machine disclosed in U.S. Pat. No. 4,006,831, attempts to fling the tortilla transversely from the end of a belt.

Stacking, counting and manipulating devices have been devised for other types of products such as rigid boxes. These include, for example, a vacuum transfer conveyor disclosed in U.S. Pat. No. 3,202,302 issued to Insolio. However, in the Insolio device the product is not placed onto the top of a conveyor but is instead delivered to the underside of a conveyor. Thereafter, the plate is dropped onto a stack, but the stack is removed in a direction perpendicular to the delivery direction so that a significant amount of time is required to remove the stack before additional sheets can be dropped. As a result, the Insolio device requires several removal stations.

U.S. Pat. No. 3,592,329 to Fleischauer discloses a conveyor in which the product is held on a conveyor belt by a vacuum so that the belt may carry the product vertically on the belt.

U.S. Pat. No. 3,272,351 to Burton, et al. discloses a sheet handling device in which a rigid, planar sheet is flung from a belt onto a stack. Once again, because of the flexible nature of food products such as tortillas, this arrangement would not be suitable for such products as tortillas.

Other article stacking, counting, and handling devices are disclosed in U.S. Pat. No. 4,256,214 to Back, Jr., U.S. Pat. No. 2,789,704 to Lewin, U.S. Pat. No. 3,771,671 to Cathers, U.S. Pat. No. 3,908,835 to Lubis, and German Pat. No. 2,062,370.

None of the devices shown in the cited references are at all capable of quickly, efficiently, and accurately stacking and counting flexible generally planar food products such as tortillas.

DISCLOSURE OF THE INVENTION

It is an object of the invention to provide an apparatus for stacking flexible, generally planar food products such as tortillas without causing the products to fold or bend.

It is another object of the invention to provide a counting and stacking machine for flexible, generally planar food products that can be quickly and easily adjusted to handle products of various sizes.

It is another object of the invention to provide an apparatus for stacking flexible, generally planar food products which are delivered to the machine in a relatively fast, random sequence.

It is a still further object of the invention to provide a stacking machine for flexible, generally planar food products which can receive such products from a variety of product discharge mechanisms.

These and other objects of the invention are provided by an apparatus having a flexible, air permeable conveyor belt extending along the upper, lower, and end surfaces of a belt support structure. Flexible, generally planar food products are placed on the belt at the upper surface of the belt support near a first end. A vacuum source communicates with a plurality of air inlets extending from the second end surface of the belt support onto a portion of the lower surface of the belt support and terminating in a drop station. As a result, the articles are held against the conveyor belt by the vacuum as they are carried downwardly along the second end of the belt support and then beneath the belt support. The articles are then dropped from the belt at the drop station where the air inlets terminate since, at that point, the vacuum in no longer present to hold the products in contact with the belt. A discharge conveyor is positioned beneath the drop station to catch the products dropped from the conveyor belt. A drive mechanism is sequentially activated to cause the discharge conveyor to intermittently carry products dropped on the discharge conveyor toward the second end of the belt support. The discharge conveyor is actuated only after a predetermined number of products have been dropped from the drop station. The discharge conveyor then carries the stack of products to a location where they are removed from the machine. The discharge conveyor preferable includes a discharge belt extending beneath the drop station and a stationary rack positioned slightly above the upper section of the discharge belt beneath the drop station. The products dropped from the conveyor belt thus land on the stationary rack instead of the moving belt. When a predetermined number of products have been stacked, an actuator changes the relative vertical positions between the rack and the discharge belt so that the stack of products is then supported on the discharge belt, thereby allowing the discharge belt to remove the stack from the rack. An aligning member is positioned above the rack in a manner that causes the products to fall along the aligning member as they are dropped onto the rack in order to insure that the products are stacked directly on top of each other. It is important to note that the discharge belt moves in a direction opposite the direction of movement of the products when they are dropped from the conveyor belt. As a result, the aligning member may remain stationary as the stack is discharged and the individual tortillas can be delivered at a faster rate without striking the stack of tortillas as it is removed. The flexible, generally planar food products are preferably carried to the conveying belt by placing the articles on a downwardly inclined entry chute having a plurality of air outlets communicating with a pressure source to form a cushion of air on the entry chute. The belt support is preferably inclined upwardly and the entry chute is adjustably mounted on the inclined portion of the conveyor belt. Thus, moving the entry chute along the conveyor belt adjusts the vertical position at which the products are received from an upstream processing machine. The positions of the discharge rack and the aligning member may be adjusted to handle products of various sizes. The discharge conveyor is operated by a control system which counts the number of products carried by the conveyor belt past a fixed location. The contents of the counter is compared to a manually selected number and, when they are equal, a reset signal is generated which resets the counter and triggers a delay timer. The delay timer is set to correspond to the time required for the products to be carried from the counting point to the drop station. After the predetermined delay, the delay timer generates an actuating signal thereby causing the discharge belt to remove a stack of products from the stationary rack.

A BRIEF DESCRIPTION OF THE DRAWINGS

FIG. 2 is a cross-sectional view taken along the line 2—2 of FIG. 1.

FIG. 3 is a schematic illustrating the flow of air and the conveyor belt drive mechanisms in the counting and stacking machine.

DETAILED DESCRIPTION OF THE PREFERRED EMBODIMENT

Figure 1:
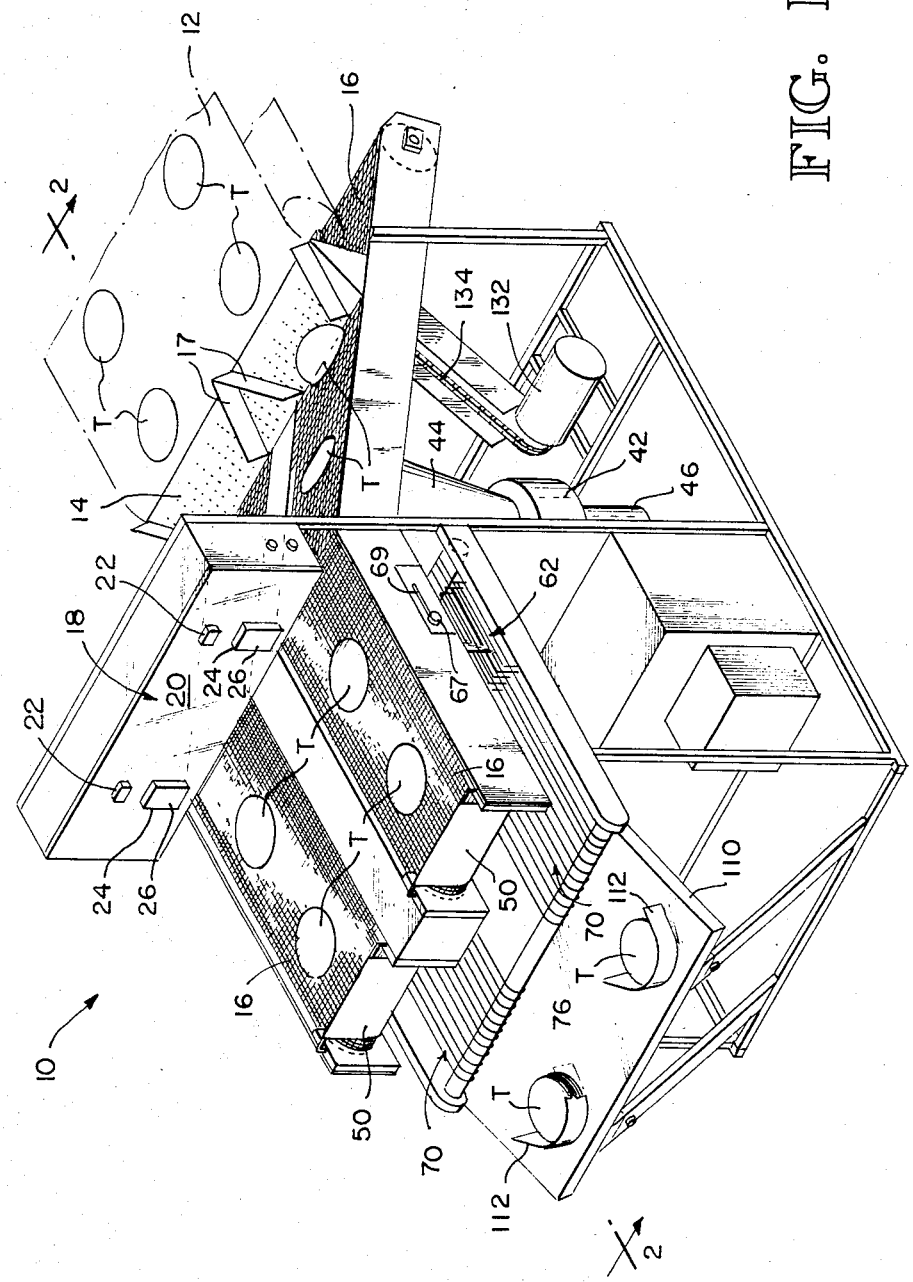
FIG. 1 is an isometric review of the counting and stacking apparatus.

The apparatus for counting and stacking flexible, generally planar food products, as illustrated in FIG. 1, includes two identical side-by-side. Flexible, generally planar food products such as tortillas T are delivered to the apparatus by suitable means such as a conveyor belt 12. The tortillas T are placed onto an entry chute 14 by the conveyor belt 12. The tortillas T then slide down the entry chute 14 onto an inclined conveyor belt 16. The entry chute 14 is adjustably positioned along the inclined portion of the belt 16 in order to adjust the vertical position at which the counting and stacking apparatus may receive tortillas from an upstream conveyor such as the conveyor belt 12. Aligning guides 17 are positioned so that the tortillas T will always contact the guides 17 as the tortillas T slide down the entry chute 14. As a result, the transverse position of the tortillas T on the belt 16 always correspond to the position of the lower ends of the guides 17 since the tortillas T will always be displaced transversely to that position.

The belt 16 carries the tortillas T to a counting station 18 where each of the tortillas T is counted. The counting station 18 also includes various electronic components explained in greater detail hereinafter. A panel 20 includes a digital readout 22 which, as explained in greater detail below, provides an indication of the number of stacks of tortillas that have been discharged by the machine. A conventional electronic counter/comparitor 24 includes a set of thumb wheels 26 for manually entering the number of tortillas to be stacked before the stack is removed from the machine. Thus, as explained in greater detail below, the tortillas are counted by an electric eye at the counting station 18 and, when a predetermined number of tortillas have been stacked as set by the thumb wheels 26, the stack is removed from the machine and the display 22 is incremented one unit.

From the counting station 18, the tortillas T are carried along a horizontal section of the belt 16. As best illustrated in FIG. 2, the conveyor belt 16 is carried by a belt support 30 which includes an inclined portion 32, a horizontal portion 34, a first end portion 36, a second end portion 38 and a bottom portion 40. The interior of the belt support 30 forms an inclosed plenum that is connected to a conventional exhaust fan 42 through duct 44. The exhaust fan 42 is driven by a conventional electric motor 46. The inclined portion 32 of the belt support 30 contains a large number of air inlets, and the belt 16 is of an open weave or mesh design. As a result, the air flowing through the belt 16 into the plenum formed by the belt support 30 forces the tortilla T against the belt 16 so that the belt 16 is able to carry the tortilla T up the incline without slipping. Similarly, the end portion 38 and bottom portion 40 of the belt support 30 contain a large number of air inlets which cause the tortillas T to adhere to the belt 16 as the tortillas T are carried by the belt 16 down the end portion 38 and along the bottom portion 40 of the belt support 30. It will be noted that a flexible plate 50 is biased against belt 16 at the end portion 38. This plate 50 is not provided to maintain the tortilla T in contact with the belt 16 since the inlets 38 in the end portion are fully capable of performing this function. Instead, the plates 50 are provided to flatten out the tortilla. Thus, the flexible plate 50 may be freely dispensed with where additional flattening of the tortilla T or other flexible, generally planar food product is not desired.

Figure 4:
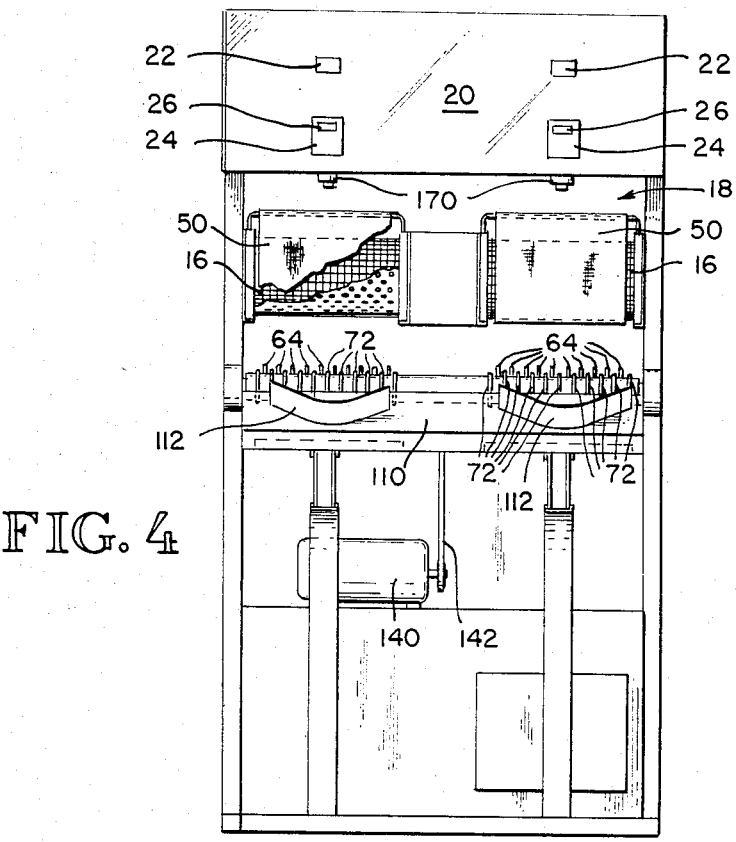
FIG. 4 is an end elavational view of the discharge end of the counting and stacking apparatus.
Figure 6:
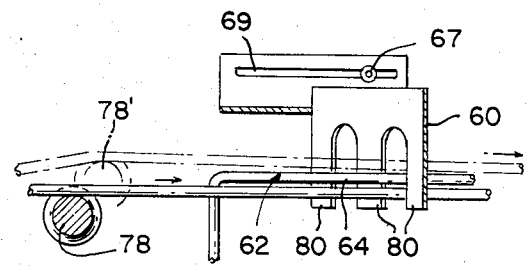
FIG. 6 is a cross-sectional view taken along the line 5—6 of FIG. 5 showing the discharge conveyor for discharging stacks of flexible, generally planar products.
Figure 5:
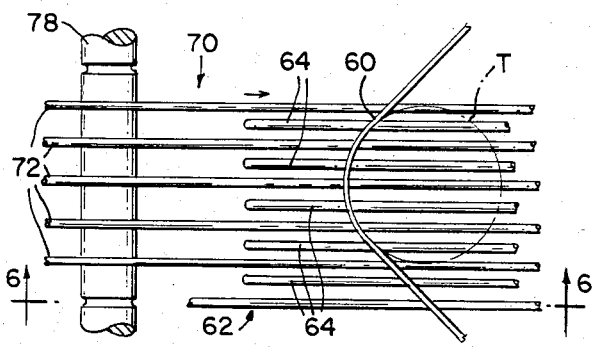
FIG. 5 is a top plan view of the discharge conveyor.

After the tortilla T passes by the end portion 38, it is carried along the bottom portion 40 of the belt support 30. However, at the approximate location 52 of the bottom portion 40, the air inlets terminate thereby allowing the tortilla T to drop from the belt 16. The location 52 thus constitutes a drop station from which the tortillas T are dropped from the belt 16. Note that while the tortillas will also move horizontally to the left (as illustrated in FIG. 2) when they are dropping, their primary movement is vertical. This primarily vertical movement is in contrast to flinging the tortillas T horizontally as carried out in conventional equipment. For this reason, there is no tendency for the tortilla to fold under or bend. With reference, now, also to FIGS. 4-6, as the tortilla T drops it contacts an arcuate aligning member 60 which guides the tortilla T as it drops onto a stationary rack 62 formed by a number of rods 64. Thus, all of the tortillas will be in contact with the aligning member 60 after they have been dropped onto the rack. In this manner, the tortillas are all stacked in substantially vertical alignment.

With reference to FIG. 1, the aligning member 60 is mounted on the side of the belt support 30 by a knob 67 extending through a slot 69. By loosening the knob 67, the aligning member 60 may be moved forwardly and rearwardly depending upon the size of the tortilla. In operation, the aligning member 60 is adjusted so that the tortilla will just contact the surface of the aligning member 60 as it drops from the belt 16.

A discharge conveyor 70 is formed by a plurality of parallel, spaced apart circular belts 72 positioned between the rods 64 of the rack 62. The cylindrical belts 72 extend between rollers 74, 76 and engage an idler roller 78. The rods 64 and belts extend between downwardly projecting fingers 80 formed in the aligning member. The rollers 74, 76 and idler roller 78 have formed therein grooves conforming to the shape of the belts 72. The grooves thus fix the transverse positions of the belts 72 to keep them spaced apart from the rods 64 forming the rack 62.

Figure 8:
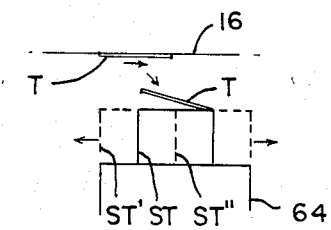
FIG. 8 is a schematic illustrating the advantages of removing a stack of products in a direction opposite the direction that individual products are delivered to the stack.

The idler roller 78 may be moved from the lowered position to a raised position 78' illustrated in FIG. 5 in which the cylindrical belts 72 are lifted above the upper surface of the rods 62. Under these circumstances circumstances, movement of the belts 72 carries the stack of tortillas to the right as illustrated in FIG. 2. By discharging the stacks of tortillas T in the same direction from which they were delivered by the belt 16 the aligning member 60 need not be moved in order to remove the stack of tortillas. Further, by removing the stack in the direction opposite the direction the Tortilla is moving as it is dropped, the dropped tortilla is able to clear the stack in less time as illustrated in FIG. 8. The tortilla is delivered by the belt 16 from left-to-right as illustrated in FIG. 8. When the tortilla drops, its leading edge extends downwardly as illustrated; and the tortilla drops on the stack ST. When the stack is removed to the left (i.e. opposite the direction it was delivered) the dropping tortilla is able to clear the stack when the stack is in the position ST'. In contrast, removing the stack to the right the same distance to the point ST" causes the tortilla T to strike the stack ST". Thus, by removing the stack in the direction opposite that the tortillas are delivered, the tortillas may be dropped at a faster rate.

As illustrated in FIG. 2, the idler roller 78 is mounted at the end of a link 90 that is pivotally mounted on stationary support 92. A pneumatic actuator 94 is also mounted on the support 92 and its actuating rod 96 is connected to link 90 through link 98. The link 98 is pivotally mounted at 99 on support 92. The actuator 94 is connected to a conventional pneumatic system, as explained below, in order to pivot link 98 clockwise thereby pivoting link 90 clockwise to lift the cylindrical belts 72. The belts 72 then remove a stack of tortillas from the rack 62. The stack of tortillas is then carried by the discharge belt 70 to an exit ramp 110 on which a semi-cylindrical discharge bin 112 is mounted. Finally, the stacks of tortillas 112 are manually removed from the discharge bins 112 and packaged. The horizontal position of the rack 62 may be adjusted to accommodate tortillas of various sizes by rotating a screw 113 rotatably mounted on upright supports 115, 117 and threaded into a nut 119 projecting downwardly from the support 92 between the supports 115, 117.

The powered components driving the belts 16, 72 and the structure for connecting the exhaust fan 42 to the remainder of the system are illustrated in greater detail in FIGS. 2 and 3. The exhaust fan 42 contains an inlet that, as explained above, communicates with the interior of the belt support 30 through duct 34. The outlet of the exhaust fan 42 is connected by duct 120 to a plenum 122 having outlets formed in the inlet chute 14. Air escaping from the plenum 122 through the outlets in the inlet chute 14 form a cushion of air thereby allowing the tortillas T to freely slide down the entry chute onto the belt 16.

The belt 16 is carried by a roller 130 that is connected to a conventional motor 132 through a belt 134. Similarly, the roller 74 is connected to a conventional motor 140 through belt 142. While the motor 140 can be energized only when it is desired to remove a stack of tortillas, the added complexity of implementing this function can be eliminated by running the motor 140 continuously, since the belts 72 carry the tortillas only when the idler roller 78 is lifted.

Figure 7:
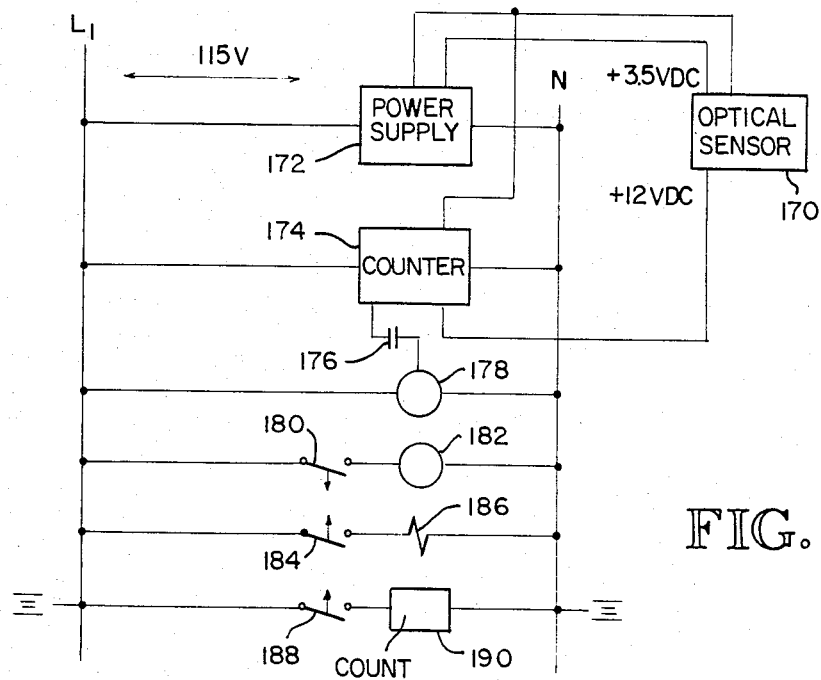
FIG. 7 is a schematic of the control system for operating the counting and stacking apparatus.

The control system for the counting and stacking apparatus is illustrated in FIG. 7. The tortillas are counted at the counting station by a conventional optical sensor 170 which can also be seen in FIG. 2. The sensor 170 is powered by a conventional power supply 172 from 115 volts raw power. The sensor 170 generates a pulse each time a tortilla is detected, and this pulse is applied to a conventional counter 174 which includes a self contained set of thumb wheel switches. The counter 174, like the sensor 170, is powered by the power supply 172. When the number of pulses generated by the sensor 170 equals the number input by the thumb wheel switches, relay contacts 176 close, thereby energizing the coil of relay 178. The coil of relay 178 then closes relay contact 180 to immediately energize relay 182. Relay 182 is a commercially available time delay relay which does not close its relay contacts 184 for an adjustably preset period of time after the relay 182 is energized. The delay on relay 182 is set to correspond to the time required for the belt 16 to carry the sensed tortilla to the drop station 52 (FIG. 2). Thus relay 182 is energized as soon as the final tortilla to be stacked is detected at the counting station 18. However, relay contact 184 does not close until after the sensed tortilla is dropped onto the rack 62. The relay contact 184 then closes, thereby energizing a conventional air solenoid 186 which applies air pressure to the actuator 94 (FIG. 2) in a conventional manner. Relay contact 188 also closes at the same time as relay contact 184. The number of closures of contact 188 is counted by a conventional digital counter 190 which may be manually reset. The counter 190 drives display 22 to provide an indication of the number of stacks discharged from the apparatus.

I claim:

1. An apparatus for stacking flexible, generally planar articles, comprising:
    a flexible, air-permeable conveyor belt extending along the upper, lower, first end, and second end surfaces of a belt support, said conveyor belt being adapted to receive said articles at the upper surface of said belt support near the first end thereof;
    a vacuum source;
    a motor driving said conveyor belt so that it moves along the upper surface of said belt support from said first end to said second end;
    a duct communicating between said vacuum source and a plurality of air inlets extending substantially continuously from the second end surface of said belt support along a portion of the lower portion of said belt support and terminating at a discharge station whereby said articles are carried by said conveyor belt along the upper, second end, and lower surfaces of said belt support to said discharge station, where said articles are dropped from said belt;
    a discharge conveyor positioned beneath said belt support near said discharge station, said discharge conveyor being positioned a sufficient distance below said discharge station that said articles are flung downwardly and away from said second end onto said discharge conveyor to form a stack of said articles; and
    a drive mechanism causing said discharge conveyor to intermittently carry said stack of articles dropped onto said conveyor toward the second end of said belt support to a location where said stack of articles is removed from said discharge conveyor.

2. The apparatus of claim 1 wherein said discharge conveyor comprises a discharge belt extending beneath said discharge station;
    powered means for driving said belt so that its upper surface moves toward the second end of said belt support;
    a rack positioned slightly above the upper surface of said discharge belt beneath said discharge station, said articles being dropped from said conveyor belt on said rack with said rack spacing said articles above the upper surface of said discharge belt; and
    an actuator intermittently changing the relative vertical position between said rack and discharge belt so that said articles are supported on said discharge belt thereby allowing said discharge belt to remove said articles from said rack.

3. The apparatus of claim 2 wherein said discharge belt is carried between first and second rollers, the first of which is positioned near said rack, and wherein said actuator intermittently lifts said first roller from a lowered position for a predetermined period, thereby lifting said discharge belt into contact with an article positioned on said rack.

4. The apparatus of claim 2 further including an aligning member positioned above said rack at a location with respect to articles dropped on said rack that is opposite the direction of movement of said discharge belt, said aligning member being positioned so that articles slide along said aligning member as they fall to said rack in order to insure that articles are stacked directly on top of each other, said aligning member being stationary as said articles are removed from said rack by said discharge belt.

5. The apparatus of claim 4 further including means for adjusting the position of said aligning member in the direction of movement of said discharge belt to correspond to the transverse dimension of said articles.

6. The apparatus of claim 1 wherein said belt support is inclined upwardly from its first end toward its second end, and said apparatus further includes an entry chute extending across said conveyor belt and movable along the belt support so that the vertical position of said entry chute can be adjusted to match the vertical position that said articles are delivered to said apparatus.

7. The apparatus of claim 6 further including at least one alignment guide mounted on said entry chute, said alignment guide being positioned at an angle with respect to the fall line of said entry chute so that articles placed on and sliding down said entry chute are displaced transversely to a predetermined location and thus placed at a predetermined transverse position on said conveyor belt.

8. The apparatus of claim 1 further including a control system operating said drive mechanism, said control system comprising:
    a counter counting the number of articles counted by the conveyor belt past a fixed counting location, said counter being reset to a predetermined number upon receipt of a reset signal;
    entry means for manually selecting the number of said articles to be stacked before said articles are removed from said rack;
    a comparator receiving respective inputs from said counter and said entry means, said comparator generating said reset signal when said counter counts to the number selected by said entry means; and a delay timer triggered by said reset signal and generating an actuating signal at a predetermined period after receipt of said reset signal, said predetermined delay corresponding to the time required for said conveyor belt to move from said fixed location to said discharge station, said actuating signal causing said drive mechanism to remove said articles from said rack.

9. The apparatus of claim 8 further including a second counter incremented by each of said actuating signals thereby counting the number of stacks of articles removed from said rack.

10. An apparatus for stacking flexible, generally planar articles, comprising:
- a flexible, air-permeable conveyor belt extending along the upper, lower, first end, and second end surfaces of a belt support, said conveyor belt being adapted to receive said articles at the upper surface of said belt support near the first end thereof, said belt support being inclined upwardly at a loading area;
- an entry chute extending across said conveyor belt and movable along the belt support at said loading area so that the vertical position of said entry chute can be adjusted to match the vertical position in which said articles are delivered to said apparatus;
- an air pressure source;
- a duct communicating between said air pressure source and a plurality of air outlets formed in the upper surface of said entry chute;
- a vacuum source;
- a duct communicating between said vacuum source and a plurality of air inlets formed on the inclined surface of said belt support;
- a motor driving said conveyor belt so that it moves along the upper surface of said belt support from said first end to said second end;
- a duct communicating between said vacuum source and a plurality of air inlets extending substantially continuously from the second end surface of said belt support along a portion of the lower portion of said belt support and terminating at a discharge station whereby said articles are carried by said conveyor belt along the upper, second end, and lower surfaces of said belt support to said discharge station, where said articles are dropped from said belt;
- a discharge conveyor positioned beneath said belt support near said discharge station; and
- a drive mechanism causing said discharge conveyor to intermittently carry articles dropped onto said conveyor toward the second end of said belt support to a location where said articles are removed from said discharge conveyor.

11. An apparatus for stacking flexible, generally planar articles, comprising:
- flexible, air-permeable conveyor belt extending along the upper, lower, first end, and second end surfaces of a belt support, said conveyor belt being adapted to receive said articles at the upper surface of said belt support near the first end thereof;
- a vacuum source;
- a motor driving said conveyor belt so that it moves along the upper surface of said belt support from said first end to said second end;
- a duct communicating between said vacuum source and a plurality of air inlets extending substantially continuously from the second end surface of said belt support along a portion of the lower portion of said belt support and terminating at a discharge station whereby said articles are carried by said conveyor belt along the upper, second end, and lower surfaces of said belt support to said discharge station, where said articles are dropped from said belt;
- a planar member biased against the conveyor belt at the second end of said belt support to apply compressive force to said articles as they are carried along said second end of said belt support;
- a discharge conveyor positioned beneath said belt support near said discharge station; and
- a drive mechanism causing said discharge conveyor to intermittently carry articles dropped onto said conveyor toward the second end of said belt support to a location where said articles are removed from said discharge conveyor.

12. An apparatus for stacking flexible, generally planar articles, comprising:
- a flexible, air-permeable conveyor belt extending along the upper and lower surfaces of a belt support and along an end surface of said belt support extending between said upper and lower surfaces, said belt support being inclined upwardly at a loading area;
- an entry chute extending across said conveyor belt and movable along said belt support at said loading area so that the vertical position of said entry chute can be adjusted;
- an air pressure source;
- a chute communicating between said air pressure source and a plurality of air outlets formed in the upper surface of said entry chute;
- a vacuum source;
- a duct extending between said vacuum source and a plurality of air inlets formed on the inclined surface of said belt support and substantially continuously along the end surface and at least a portion of the lower surface of said belt support; and
- a motor driving said conveyor belt and causing said belt to move along the upper surface, down the end surface and along the lower surfaces of said belt support such that flexible, generally planar articles placed on said belt at the upper surface of said belt support are held in contact with said belt by said vacuum and carried by said belt down the end surface and along the underside of said belt support and dropped at a predetermined location at which said belt terminates.

13. The apparatus of claim 12, further including at least one alignment guide mounted on said entry chute, said alignment guide being positioned at an angle with respect to the fall line of said entry chute so that articles placed on and sliding down said entry chute are displaced transversely to a predetermined location and thus placed at a predetermined tranverse position on said conveyor belt.

14. An apparatus for stacking flexible, generally planar articles, comprising:
- a flexible, air-permeable conveyor belt extending along the upper and lower surfaces of a belt support and along an end surface of said belt support extending between said upper and lower surfaces;
- a planar member biased against said conveyor belt at the end surface of said belt support to apply a compressive force to said articles as they are carried along the end surface of said belt support;

a vacuum source;

a duct extending between said vacuum source and a plurality of air inlets positioned substantially continuously along the end surface and at least a portion of the lower surface of said belt support; and a motor driving said conveyor belt and causing said belt to move along the upper surface, down the end surface and along the lower surfaces of said belt support such that flexible, generally planar articles placed on said belt at the upper surface of said belt support are held in contact with said belt by said vacuum and carried by said belt down the end surface and along the underside of said belt support and dropped at a predetermined location at which said belt terminates.

15. An apparatus for stacking flexible, generally planar articles, comprising:

an air-permeable conveyor belt extending along the lower surface of a belt support;

a vacuum source;

a duct extending between said vacuum source and a plurality of air inlets positioned along a portion of the lower surface of said belt support; and a conveying mechanism delivering said articles to sid belt on the other side of said belt support at a location communicating with said air inlet;

a motor driving said conveyor belt and causing said belt to move along the lower surface of said belt support such that said articles are held in contact with said belt by said vacuum and carried along the underside of said belt support in a first direction to a predetermined discharge location determined by the termination of said air inlets where said articles are dropped;

a discharge conveyor positioned beneath said belt support at a location with respect to said discharge location that causes said articles to be flung in said first direction as they are dropped from said discharge location onto said discharge conveyor so that said articles are placed in a stack at a stacking location on said belt; and a drive mechanism actuated after a predetermined number of articles have been dropped onto said discharge conveyor to cause said discharge conveyor to carry said stack of articles in a direction opposite said first direction, thereby minimizing the time required to remove said stack of articles from said stacking location before additional articles are dropped onto said discharge conveyor.

16. The apparatus of claim 15 wherein said discharge conveyor comprises:

a discharge belt extending beneath the predetermined location where said articles are dropped from said conveyor belt;

power means for driving said conveyor belt so that its upper surface moves toward the second end of said belt support;

a stationary rack positioned slightly above the upper surface of said discharge belt beneath the location where said articles are dropped from said conveyor belt, said articles being dropped from said conveyor belt onto said rack with said rack spacing said articles above the upper surface of the discharge belt; and an actuator intermittently changing the relative vertical position between said rack and discharge belt so that said articles are supported on said discharge belt thereby allowing said discharge belt to remove said articles from said rack.

17. The apparatus of claim 16 wherein said discharge belt is carried between first and second rollers, the first of which is positioned near said rack, and wherein said actuator intermittently lifts the first roller from a lower position for a predetermined period, thereby lifting said discharge belt into contact with an article placed on said rack.

18. The apparatus of claim 16 further including an aligning member positioned above said rack at a location with respect to articles dropped on said rack that is opposite the direction of movement of said discharge belt, said aligning member being positioned so that articles slide along said aligning member as they fall to said rack in order to insure that articles are stacked directly on top of each other, said aligning member being stationary as said articles are removed from said rack by said discharge belt.

19. The apparatus of claim 18 further including means for adjusting the position of said aligning member in the direction of movement of said discharge belt to correspond to the transverse dimension of said articles.

20. The apparatus of claim 15 further including a control system operating said drive mechanism, said control system comprising:

a counter counting the number of articles carried by said conveyor belt past a fixed counting location, said counter being reset to a predetermined number upon receipt of a reset signal;

entry means for manually selecting the number of said articles to be stacked before said articles are removed from said rack;

a comparator receiving respective inputs from said counter in said entry means, said comparator generating said reset signal when said counter counts to the number selected by said entry means; and a delay timer triggered by said reset signal and generating an actuating signal a predetermined period after receipt of said reset signal, said predetermined delay corresponding to the time required for said conveyor belt to move from said fixed location to said predetermined location where said articles are dropped from said conveyor belt, said actuating signal causing said drive mechanism to remove said articles from said rack.

* * * * *